United States Patent [19]
Wakahara et al.

[11] Patent Number: 5,403,242
[45] Date of Patent: Apr. 4, 1995

[54] AUTOMATIC TRANSMISSION WITH ONE-WAY CLUTCH FRICTION SUPPRESSION SYSTEM

[75] Inventors: Tatsuo Wakahara, Kawasaki; Satoshi Sakakibara, Yamato; Akihiro Ueki, Isehara, all of Japan

[73] Assignee: Nissan Motor Co, Ltd., Yokohama, Japan

[21] Appl. No.: 26,153

[22] Filed: Mar. 3, 1993

[30] Foreign Application Priority Data

Mar. 9, 1992 [JP] Japan ............................ 4-050734

[51] Int. Cl.⁶ ............................................ B60K 41/24
[52] U.S. Cl. ................................. 475/119; 475/120; 475/129; 475/131
[58] Field of Search ............... 475/120, 127, 128, 129, 475/131, 132, 116, 119

[56] References Cited

U.S. PATENT DOCUMENTS

| | | | |
|---|---|---|---|
| 4,501,174 | 2/1985 | Sugano | 475/131 X |
| 4,709,597 | 12/1987 | Yasue et al. | 475/129 X |
| 4,718,310 | 1/1988 | SHindo et al. | 475/120 X |

OTHER PUBLICATIONS

"Maintenance Manual of Nissan Vehicle", Nissan Motor Co., Ltd., Aug., 1991.

*Primary Examiner*—Michael Koczo
*Attorney, Agent, or Firm*—Foley & Lardner

[57] ABSTRACT

Under a higher speed gear position of the transmission, a control valve can drain a hydraulic pressure of a forward clutch to cause the forward clutch to take a disengaged condition. With this, undesired friction of a forward one-way clutch under such higher speed gear position is suppressed. A fail-safe system is employed for recovering an engaged condition of the forward clutch even when the control valve is stuck at such pressure draining position.

8 Claims, 6 Drawing Sheets

| FRICTION ELEMENT / GEAR POSITION | B/B | | | H/C | F/C | FO/C | OR/C | LO/C | LR/B | R/C |
|---|---|---|---|---|---|---|---|---|---|---|
| | 2A | 3R | 4A | | | | | | | |
| REVERSE | | | | | | | | | ○ | ○ |
| FORWARD 1'ST-SP. | ○ | | | | ○ | ○ | | | △ | |
| FORWARD 2'ND-SP. | ○ | ○ | | ○ | ○ | ○ | △ | | | |
| FORWARD 3'RD-SP. | ○ | ○ | | ○ | ○ | ○ | △ | ○ | | |
| FORWARD 4'TH-SP. | | | ○ | ○ | (○) | | | | | |

| GEAR POSITION \ SHIFT SOLENOID | A | B |
|---|---|---|
| 1'ST-SPEED | ON | ON |
| 2'ND-SPEED | OFF | ON |
| 3'RD-SPEED | OFF | OFF |
| 4'TH-SPEED | ON | OFF |

AUTOMATIC TRANSMISSION WITH ONE-WAY CLUTCH FRICTION SUPPRESSION SYSTEM

BACKGROUND OF THE INVENTION

1. Field of the Invention

The present invention relates in general to automatic transmissions for motor vehicles and more particularly to automatic transmissions of a type which are equipped with a one-way clutch friction suppression system. More specifically, the present invention is concerned with an improvement in the one-way clutch friction suppression system, which can provide the transmission with a fail-safe operation.

2. Description of the Prior Art

An automatic transmission comprises a plurality of friction elements, such as, friction clutches, friction brakes and the like, which are forced to engage and/or disengage by hydraulic power for obtaining various speed gear positions of the transmission.

Usually, in a lower speed gear position, the power transmission is carried out by using or engaging a one-way clutch. Upon requirement of up-shifting from such lower speed gear position to a higher speed gear position, the engaged condition of the one-way clutch is canceled or released. This method of up-shifting can reduce undesired select shock by a certain degree.

One of automatic transmissions of this type is disclosed in "MAINTENANCE MANUAL OF NISSAN VEHICLE" issued August, 1991 from NISSAN MOTOR CO., LTD. In this transmission, a forward one-way clutch is employed which corresponds to the above-mentioned one-way clutch. The one-way clutch becomes engaged to contribute to the power transmission when achieving first, second and third speed gear positions. Upon up-shifting from third to fourth speed gear position, the one-way clutch becomes disengaged and a band brake becomes engaged.

However, in the transmission disclosed in the publication, even in the fourth speed gear position, inner and outer races of the forward one-way clutch are kept rotated by respective rotating members, and thus, a certain friction is inevitably produced between the inner and outer races, which causes the power loss and thus deteriorates the fuel consumption of the engine.

In order to solve the above-mentioned drawback, a measure may be thought out in which a control valve is added to the hydraulic control circuit to drain the hydraulic pressure of a forward clutch to obtain a full released condition of the forward one-way clutch upon the up-shifting from third to fourth speed gear position. However, when employing this measure, a new fear may arise in that if, due to some accident, the control valve becomes stuck at such drain permitting position, engagement of the forward clutch is not obtained and thus first, second and third gear positions are not obtained any longer.

SUMMARY OF THE INVENTION

It is therefore an object of the present invention to provide an automatic transmission with a one-way clutch friction suppression system, which is free of the above-mentioned fear.

It is a further object of the present invention to provide an automatic transmission with a one-way clutch friction suppression system, which is equipped with a so-called "fail-safe means" by which the associated motor vehicle can be driven at a lower speed gear position even if the transmission encounters the above-mentioned trouble.

According to a first aspect of the present invention, there is provided an automatic transmission which comprises a manual valve movable to a position to produce a hydraulic pressure which allows the transmission to automatically select a desired speed gear position; a one-way clutch having engaged and disengaged conditions; a first friction element which, when receiving the hydraulic pressure from the manual valve, is engaged to cause the transmission to take a lower speed gear position with an aid of the engaged condition of the one-way clutch; a second friction element which, when engaged under the lower speed gear position, cancels the engaged condition of the one-way clutch thereby to cause the transmission to take a higher speed gear position; a control valve which, under the higher speed gear position, can drain a hydraulic pressure of the first friction element to suppress undesired friction of the one-way clutch; and means for causing the first friction element to become engaged when the manual valve is moved to another position to produce a given hydraulic pressure for causing the transmission to take an engine brake permitting condition.

According to a second aspect of the present invention, there is provided an automatic transmission which comprises a manual valve movable to D-range position to produce a hydraulic pressure which allows the transmission to automatically select a desired speed gear position; a forward one-way clutch having engaged and disengaged conditions; a forward clutch which, when receiving the hydraulic pressure from the manual valve, is engaged to cause the transmission to take a lower speed gear position with an aid of the engaged condition of the forward one-way clutch; a band brake which, when engaged under the lower speed gear position, cancels the engaged condition of the forward one-way clutch thereby to cause the transmission to take a higher speed gear position; a forward clutch control valve which, under the higher speed gear position, can drain a hydraulic pressure of the forward clutch to disengage the same; and fail-safe means for causing the forward clutch to become engaged when the manual valve is moved to Second-range position to produce a 2'nd-range pressure for causing the transmission to take a gear position which permits engine brake.

DETAILED DESCRIPTION OF THE INVENTION

In the following, the present invention will be described in detail with reference to the accompanying drawings.

Figure 1:
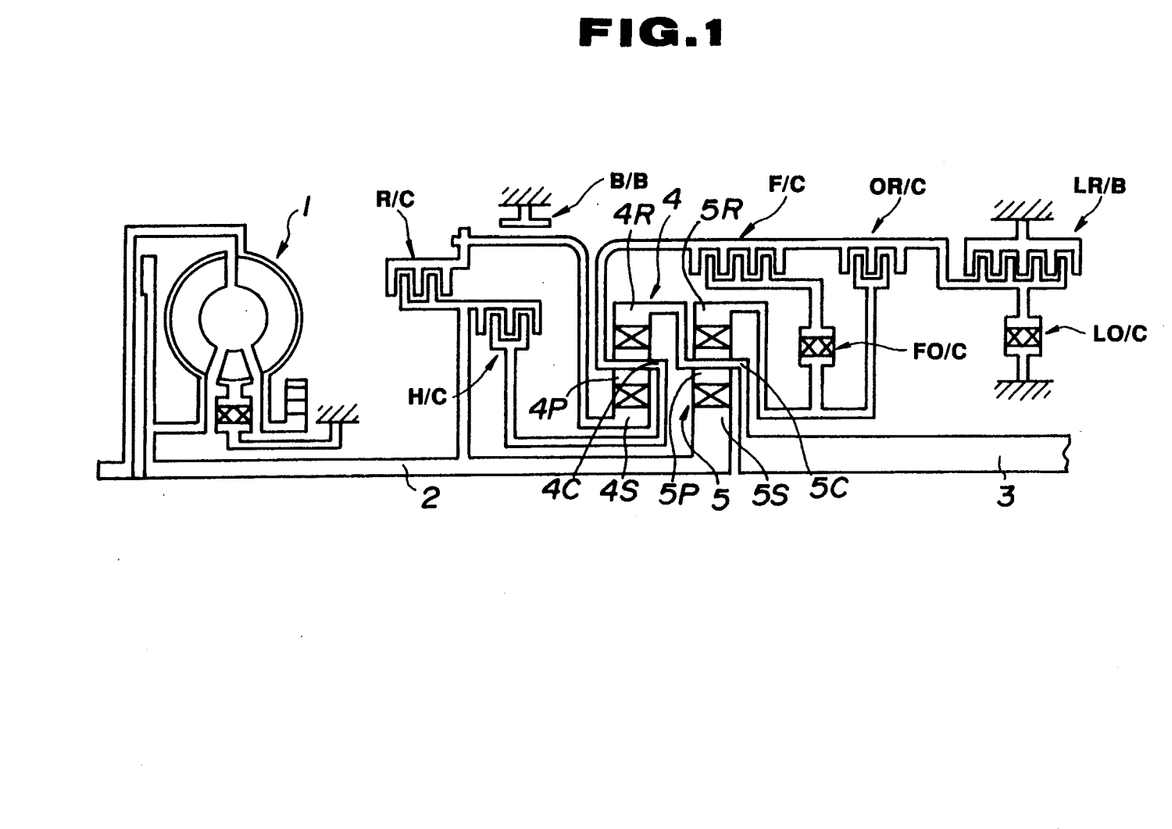
FIG. 1 is a schematic view of an automatic transmission with a one-way clutch friction suppression system, according to the present invention.

In FIG. 1, there is schematically shown an automatic transmission to which the invention is practically applied. The transmission generally comprises an input shaft 2 which receives a torque from a torque converter 1, an output shaft 3 which is arranged coaxial with the input shaft 2, first and second planetary gear units 4 and 5 which are coaxially disposed about a common axis of the input and output shafts 2 and 3, and various friction elements which will be described hereinafter. The detail of the transmission is described in the above-mentioned publication of NISSAN.

The first planetary gear unit 4 is of a simple type which comprises a sun gear 4S, a ring gear 4R, pinions 4P meshed with both the sun gear 4S and the ring gear 4R, and a pinion carrier 4C rotatably carrying the pinions 4P. Similar to the first unit 4, the second planetary gear unit 5 comprises a sun gear 5S, a ring gear 5R, pinions 5P and a pinion carrier 5C.

In the following, description will be directed to the various friction elements which conduct the speed change control of the transmission.

The pinion carrier 4C is connectable to the input shaft 2 through a high clutch H/C. The sun gear 4S is connectable to a fixed portion through a band brake B/B and connectable to the input shaft 2 through a reverse clutch R/C. The pinion carrier 4C is connectable to a fixed portion through a low reverse brake LR/B of multi-plate type and connectable to a fixed portion through a low one-way clutch LO/C. With this clutch LO/C, a rotation of the pinion carrier 4C in a direction reversed to that of the engine is suppressed.

The ring gear 4R is integrally connected to both the pinion carrier 5C of the second planetary gear unit 5 and the output shaft 3 to rotate therewith. The sun gear 5S of the second planetary gear unit 5 is fixed to the input shaft 2 to rotate therewith. The ring gear 5R is connectable to the pinion carrier 4C through an over-run clutch OR/C. Furthermore, the ring gear 5R is connectable to the pinion carrier 4C through a forward one-way clutch FO/C and a forward clutch F/C. When the forward clutch F/C is engaged, engagement of the forward one-way clutch FO/C induces a condition wherein the ring gear 5R is united with the pinion carrier 4C under rotation of the ring gear 5R in the reversed direction (that is, in the direction opposite to that of the engine rotation).

The high clutch H/C, the reverse clutch R/C, the low reverse brake LR/B, the over-run clutch OR/C and the forward clutch F/C are powered by hydraulic pressure to take the above-mentioned engaged (ON) conditions.

Figure 2:
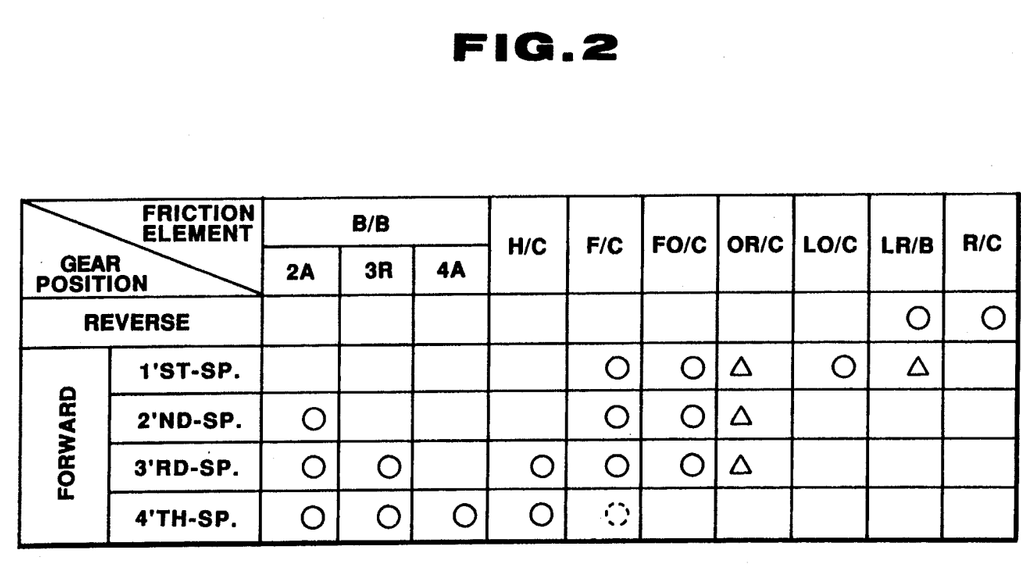
FIG. 2 is a TABLE showing ON/OFF conditions of various friction elements which are taken when the transmission assumes various speed gear positions.

As is seen from the TABLE of FIG. 2, the band brake B/B has a second speed servo-apply chamber 2A, a third speed servo-release chamber 3R and a fourth speed servo-apply chamber 4A. That is, normally, the band brake B/B assumes a release or disengaged condition. When only the chamber 2A is supplied with hydraulic pressure, the band brake B/B becomes engaged, and when in addition to the chamber 2A, the chamber 3R is supplied with hydraulic pressure, the band brake B/B becomes released or disengaged, and when, in addition to the chambers 2A and 3R, the chamber 4A is supplied with hydraulic pressure, the band brake B/B becomes engaged.

As is seen from the TABLE of FIG. 2, by forcing the various friction elements B/B, H/C, F/C, OR/C, LR/B, R/C, FO/C and LO/C to take engaged(ON) and disengaged(OFF) conditions selectively, the connection manner between the first and second planetary gear units 4 and 5 is changed which allows the output shaft 3 to rotate at various speed ratios relative to the input shaft 2. That is, four forward speed gear positions and one reverse gear position are obtained, as shown.

In the TABLE of FIG. 2, the mark "Δ" indicates an engaged condition which is necessary when an engine brake is obtained. As is seen from the mark "Δ", during the time for which the over-run clutch OR/C is kept operated, the forward one-way clutch FO/C arranged in parallel with the over-run clutch OR/C is kept engaged enabling the engine brake. Furthermore, during the time for which the low reverse brake LR/B is kept operated, the low one-way clutch LO/C arranged in parallel with the low reverse brake LR/B is kept engaged enabling the engine brake.

In the TABLE of FIG. 2, the only circle illustrated by a broken line indicates an engaged condition of the forward clutch F/C, which does not contribute to the power transmission in the fourth speed gear position. This has been caused by an inherent construction of the hydraulic control circuit. That is, in this fourth speed gear position, the outer race of the forward one-way clutch FO/C is forced to rotate at the speed of the input shaft 2 and the inner race of the forward one-way clutch FO/C is forced to rotate at a speed higher than the input shaft 2. Thus, under this condition, relative rotation inevitably arises between the outer and inner races of the forward one-way clutch FO/C, which causes undesired friction therebetween and thus induces lowering in fuel consumption of the engine.

However, in the present invention, the following measure is employed for dealing with such fear.

That is, in the present invention, in the fourth speed gear position, the hydraulic pressure of the forward clutch F/C is drained to disengage the forward clutch F/C. Due to this disengagement, the outer race of the forward one-way clutch FO/C is disengaged from the rotating member and now rotated by or together with the inner race of the same. Thus, undesired friction between the outer and inner races, which would induce a power loss and thus lower fuel consumption of the engine, is prevented or at least minimized.

As will be described in detail hereinafter, in order to put the advantageous idea into realization, a control valve and a so-called "fail-same means" are employed in the present invention. That is, the control valve functions to drain the hydraulic pressure of the forward clutch F/C, and the fail-safe means functions to deal with a possible stuck condition of the control valve at the drain permitting position. That is, even when the control valve is stuck at such drain position, normal operation of the forward clutch F/C is available thereby to assure the first, second and third speed gear positions of the transmission.

Figure 3:
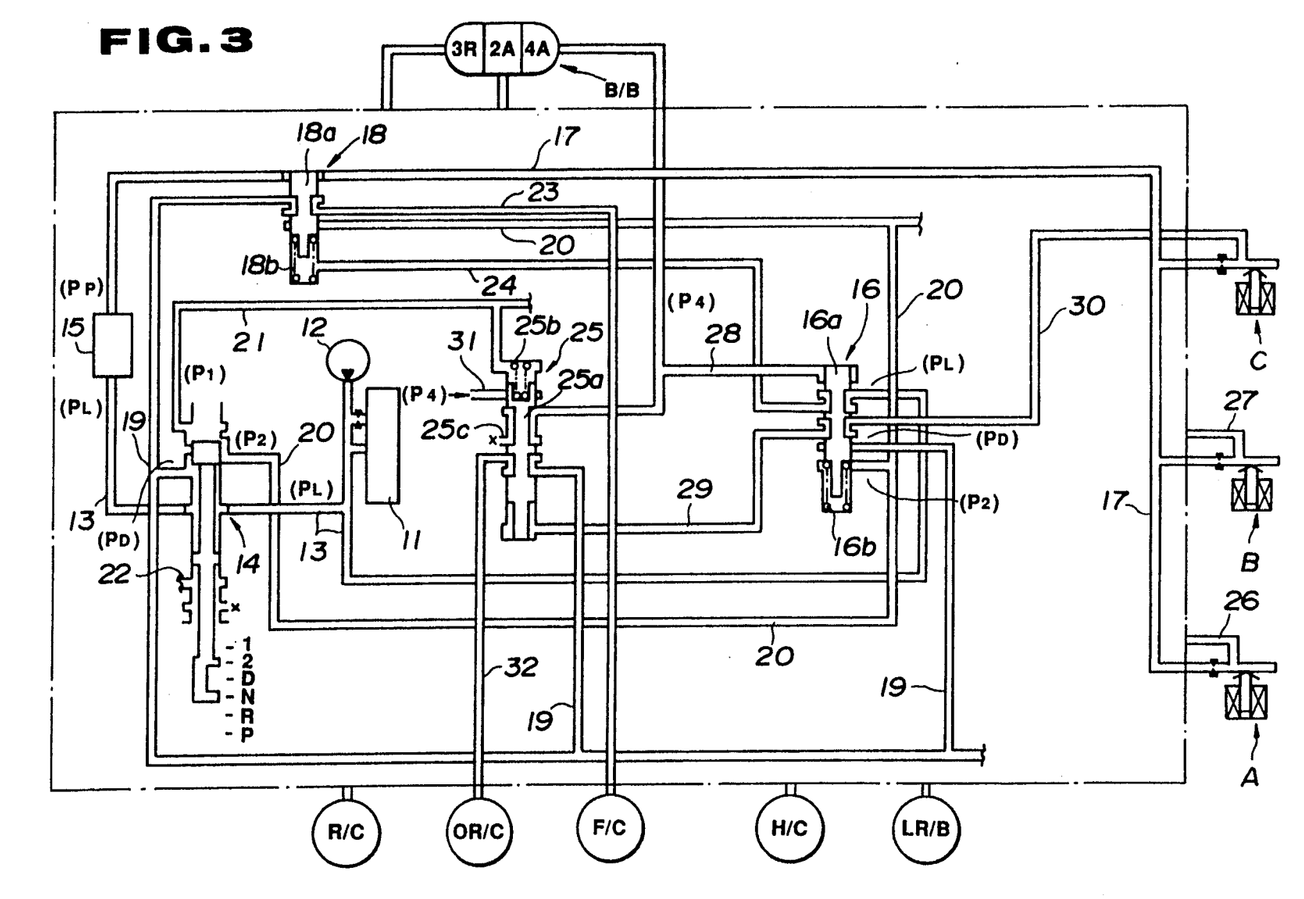
FIG. 3 is a hydraulic control circuit, but showing only a part associated with the one-way clutch friction suppression system.

FIG. 3 shows but partially a hydraulic control circuit which embodies the invention. It is to be noted that the remaining base portion of the circuit is substantially disclosed in the above-mentioned publication of NISSAN.

In FIG. 3, denoted by numeral 11 is a regulator valve which regulates the hydraulic pressure from an oil pump 12 to a line pressure PL which is applied to a fluid line 13. The line pressure PL is fed to a manual valve 14, a pilot valve 15 and a switching valve 16. The pilot valve 15 reduces the line pressure PL to obtain a pilot pressure PP which is fed through a fluid line 17 to a forward clutch control valve 18, shift solenoids A and B and an over-run clutch solenoid C.

The manual valve 14 is moved with a shift lever which is manually operated by a driver in accordance with any gear position which he or she wishes to select. When the shift lever is moved to Parking(P)-position (or Neutral(N)-position) for parking the vehicle, the manual valve 14 blocks any supply of line pressure from the fluid line 13 and drains the pressure therefrom. While, when the shift lever is moved to Drive(D)-position for achieving the automatic gear change driving, the manual valve 14 flows the line pressure from the fluid line 13 to a fluid line 19 as D-range pressure PD and drains the pressure in the remaining output fluid lines. When, for obtaining engine brake at the second speed, the shift lever is moved to Second(2)-position, the manual valve 14 flows the line pressure from the fluid line 13 to a fluid line 20 as 2'nd-range pressure P2 and drains the pressure in the remaining output fluid lines. When, for obtaining engine brake at the first speed, the shift lever is moved to First(1)-position, the manual valve 14 flows the line pressure from the fluid line 13 to a fluid line 21 as 1'st-range pressure P1 and drains the pressure in the remaining output fluid lines. Furthermore, when, for achieving reversed movement of the vehicle, the shift lever is moved to Reverse(R)-position, the manual valve 14 flows the line pressure from the fluid line 13 to a fluid line 22 as R-ranged pressure and drains the pressure in the remaining output fluid lines.

The D-range pressure fluid line 19 has one end connected to the forward clutch control valve 18. When a spool 18a assumes an upper position as illustrated in the drawing, the valve 18 connects a fluid line 23 to the D-range pressure fluid line 19. While, when the spool 18a assumes a lower position (not shown), the valve 18 connects the fluid line 23 to the 2'nd-range pressure fluid line 20. The spool 18a has an upper end constantly exposed to the pilot pressure PP of the fluid line 17 and has a lower end constantly exposed to the pressure from a fluid line 24 and pressed by a spring 18b. That is, in response to presence and absence of hydraulic pressure in the fluid line 24, the spool 18a is moved between the illustrated upper position and the lower position (not shown).

Figure 4:
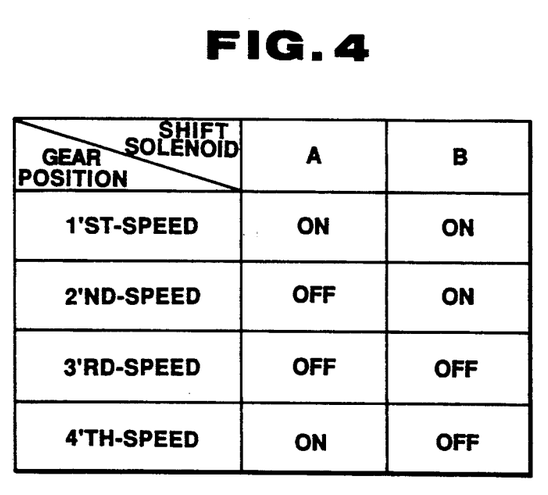
FIG. 4 is a TABLE showing ON/OFF conditions of two shift solenoids employed in the control circuit, with respect to various speed gear positions of the transmission.

The D-range pressure fluid line 19 has other ends connected to the switching valve 16 and an over-run clutch control valve 25. Although not shown in the drawing, the fluid line 19 has further the other end connected to a known D-range gear change control circuit. That is, by the D-range gear change control circuit, the two shift solenoids A and B are controlled to take ON/OFF conditions as shown in the TABLE of FIG. 4 to complete the engaged/disengaged states of the various friction elements as shown in FIG. 1 thereby to obtain an automatic selection between the first and fourth speed gear positions. When assuming ON condition, the shift solenoids A and B feed the pilot pressure PP of the fluid line 17 to fluid lines 26 and 27 as a gear change control signal, and when assuming OFF condition, they drain the fluid lines 26 and 27.

The switching valve 16 comprises a spool 16a which has an upper end exposed to a fourth speed gear position selection pressure P4 of a fluid line 28 and has a lower end exposed to the pressure P2 of the 2'nd-range pressure fluid line 20 and pressed by a spring 16b. When the spool 16a takes an upper position as shown in FIG. 3, the fluid line 24 from the forward clutch control valve 18 becomes communicated with the line pressure fluid line 13 and at the same time, a fluid line 29 from the over-run clutch control valve 25 becomes communicated with a fluid line 30 from the over-run clutch solenoid C. While, when the spool 16a assumes a lower position, the fluid line 24 becomes communicated with the fluid line 30, and at the same time, the fluid line 29 becomes communicated with the D-range pressure fluid line 19.

The above-mentioned fourth speed gear position selection pressure P4 in the fluid line 28 is a pressure which is to be produced when the fourth speed gear position is needed under the automatic gear change driving. That is, when the over-run clutch control valve 25 connects the fluid line 31 with the fluid line 28, the pressure P4 is fed to the fourth speed servo-apply chamber 4A of the band brake B/B to cause the transmission to select the fourth speed gear position. The over-run clutch solenoid C is substantially the same in construction to the shift solenoids A and B. That is, when assuming ON condition, the pilot pressure of the fluid line 17 is fed to the fluid line 30, and when assuming OFF condition, the fluid line 30 is drained.

The over-run clutch control valve 25 comprises a spool 25a which has an upper end exposed to the 1'st-range pressure P1 of the fluid line 21 and pressed by a spring 25b and has a lower end exposed to the pressure of the fluid line 29. When the spool 25a assumes a lower position as shown in the drawing, the fluid line 28 becomes communicated with a drain port 25c and at the same time, a fluid line 32 from the over-run clutch OR/C becomes communicated with the D-range pressure fluid line 19. While, when the spool 25a assumes an upper position, the fluid lines 28 and 32 become communicated with the fluid line 31 and the drain port 25c respectively.

In the following, operation of the invention will described.

When the vehicle is under the automatic gear change driving with the manual valve 14 assuming D-range, the first to fourth speed gear positions are automatically selected in such a manner as shown in the TABLES of FIGS. 2 and 4. When the first to third speed gear positions are selected, the fourth speed gear position selection pressure P4 is not produced. Under this condition, the switching valve 16 keeps the spool 16a at the illustrated upper position, and thus the fluid lines 24 and 29 are communicated with the fluid lines 13 and 30 respectively. Thus, the line pressure PL is fed to the fluid line 24, so that the spool 18a of the forward clutch control valve 18 is forced to take the illustrated upper position. With this, the D-range pressure PD outputted to the D-range fluid line 19 is led through the valve 18 and the fluid line 23 to the forward clutch F/C thereby to cause the same to assume its engaged condition. Thus, the first, second and third speed gear positions are available.

When, under the first, second or third speed gear position driving, engine brake becomes necessary, the over-run clutch solenoid C is forced OFF by a known computer (not shown) and thus the fluid line 30 is drained. Thus, the fluid line 29 kept connected to the fluid line 30 becomes drained, so that the over-run clutch control valve 25 connects the fluid line 32 to the D-range pressure fluid line 19 thereby to cause the over-run clutch OR/C to take the engaged condition. With this, a so-called "automatic engine brake" is carried out. While, when such engine brake is not necessary, the over-run clutch solenoid C is kept ON and thus the pilot pressure PP is fed to the fluid line 30 and through the fluid line 29 to the over-run clutch control valve 25. Thus, the valve 25 connects the over-run clutch OR/C to the drain port 25c to cause the clutch OR/C to take disengaged condition, and at the same time, the valve 25 connects the fluid line 28 to the fluid line 31.

Accordingly, when the fourth speed gear position selection pressure P4 is produced in the fluid line 31, the pressure P4 is fed through the fluid line 28 to the fourth speed servo-apply chamber 4A of the band brake B/B to cause the same to take the engaged condition. Thus, the fourth speed gear position is obtained.

Under this fourth speed gear position driving of the D-range, the fourth speed gear position selection pressure P4 is applied to the upper end of the spool 16a of the switching valve 16, but the lower end of the spool 16a has no 2'nd- range pressure P2 applied thereto. Thus, the spool 16a is moved to the lower position against the spring 16b, and thus, the fluid lines 24 and 29 are switched to communicate with the fluid lines 30 and 19 respectively. Due to the communication between the fluid lines 24 and 30, the control of the forward clutch control valve 18 by the over-run clutch solenoid C becomes available, and due to the communication between the fluid lines 29 and 19, the spool 25a of the over-run clutch control valve 25 is kept at the upper position. Thus, keeping the band brake B/B at the engaged condition by the fourth speed gear position selection pressure P4 (viz., the fourth speed gear selection) and keeping the spool 16a of the switching valve 16 at the lower position become available.

Figure 5:
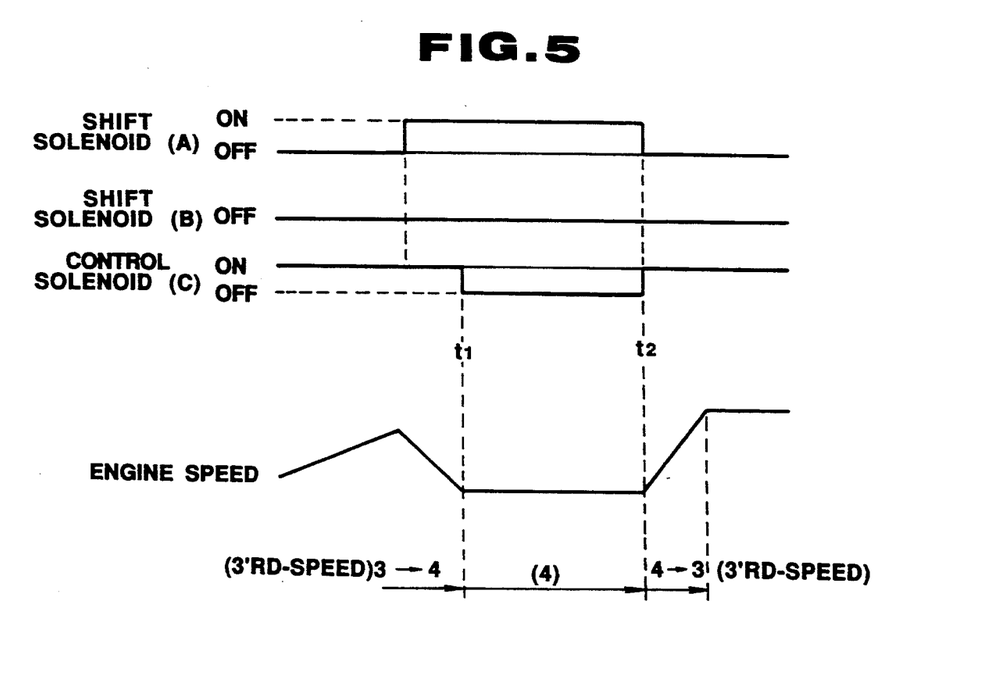
FIG. 5 is a time chart showing ON/OFF conditions of three shift solenoids with respect to an engine speed.

When, as is shown in FIGS. 4 and 5, during the moment (viz., from t1 to t2) for which the fourth speed gear position is kept during a shift change operation from 3'rd-speed to 4'th-speed or vice versa which is carried out by ON-OFF operation of the shift solenoid A, the over-run clutch solenoid C is turned OFF, the fluid line 30 becomes drained and thus the fluid line 24 becomes drained causing the spool 18a of the forward clutch control valve 18 to take a lower position thereby switching the fluid line 23 to the 2'nd-range pressure fluid line 20. Because, in this D-range, the 2'nd-range pressure fluid line 20 has been drained, the hydraulic pressure for the forward clutch F/C is drained through the fluid line 20. Thus, the forward clutch F/C becomes disengaged.

Thus, as will be understood from the above description, the forward clutch F/C which does not contribute to the power transmission in the fourth speed gear position takes the disengaged (or OFF) condition. This means that undesired friction between the outer and inner races of the forward clutch F/C, which would induce a power loss and lowering in fuel consumption of the engine, is prevented or at least minimized.

If, due to some reason, the forward clutch control valve 18 fails to operate with the spool 18a stuck at its lower position wherein the hydraulic pressure for the forward clutch F/C is drained, engaged condition of the forward clutch F/C is not provided and thus driving at the first, second or third speed gear position is not available.

However, in the present invention, the following fail-safe action is possible. That is, in such a case, the shift lever of the transmission is moved to Second(2)-position having the manual valve 14 moved to 2'nd-range position. With this, the fluid line 20 is fed with the 2'nd range pressure P2 and thus the forward clutch F/C is fed with the pressure P2 to take the engaged condition. Thus, driving at the first, second or third speed gear position becomes available. That is, even when the control valve 18 is subjected to the above-mentioned stick-trouble, the driving at such a lower speed gear position is available by only moving the shift lever to the Second-position.

Figure 6:
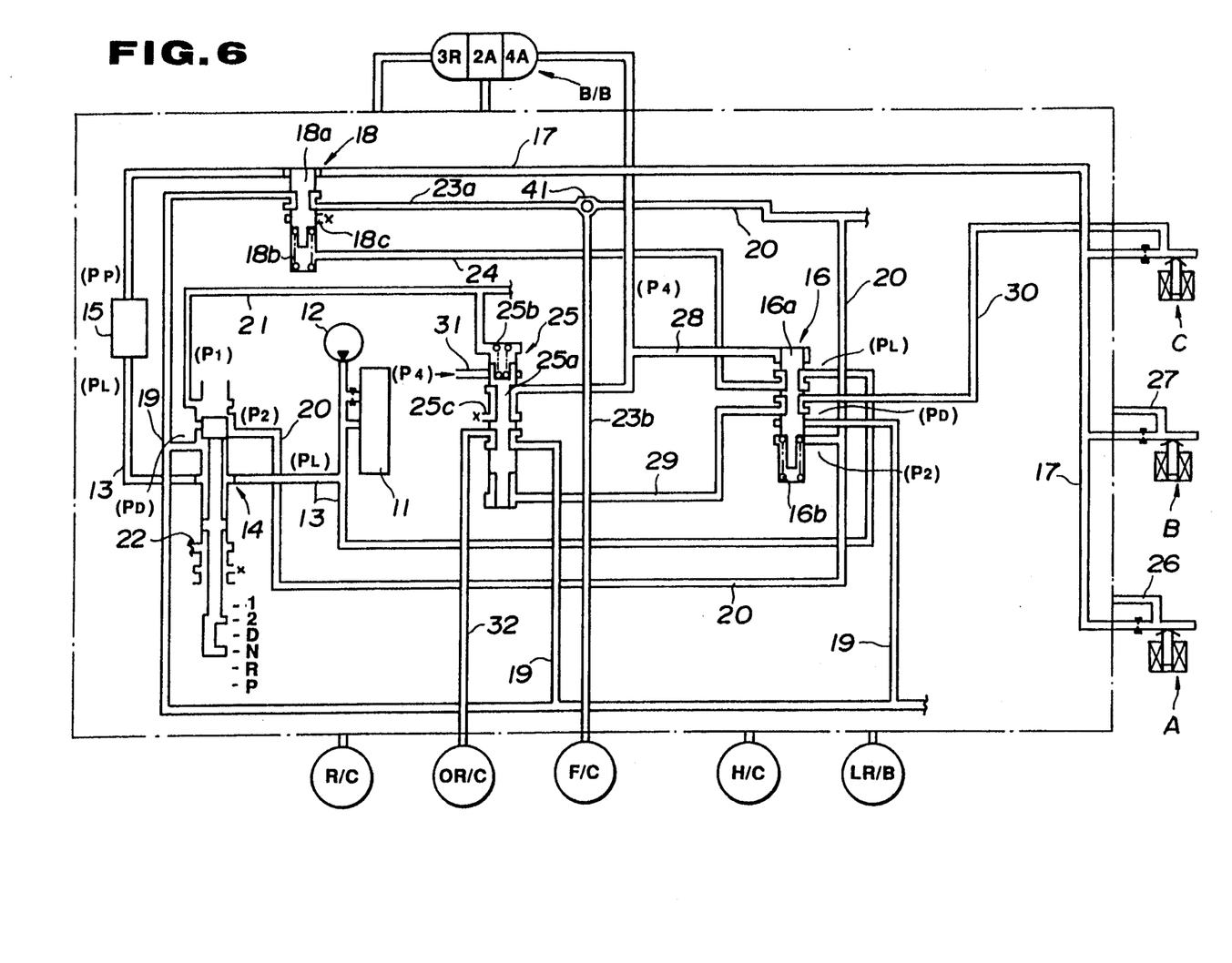
FIG. 6 is a view similar to FIG. 1, but showing a modification of the present invention.

Referring to FIG. 6, there is shown but partially a hydraulic control circuit which constitutes a modification of the present invention. That is, in this modification, the above-mentioned fail-safe action is much assured.

As shown in FIG. 6, in this modification, the fluid line (which corresponds to the fluid line 23 of the circuit of FIG. 3) between the forward clutch F/C and the forward clutch control valve 18 comprises first and second line parts 23a and 23b which are connected through a shuttle valve 41. That is, the first line part 23a extends from the control valve 18 to one of two inlet ports of the shuttle valve 41, and the second line part 23b extends from the forward clutch F/C to an outlet port of the shuttle valve 41. The other inlet portion of the shuttle valve 41 is connected to the 2'nd-range pressure fluid line 20. Furthermore, in this modification, a port 18c of the control valve 18 (which port corresponds to the port to which the 2'nd-range pressure fluid line 20 is connected in the circuit of FIG. 3) is serves as a drain port.

At the First(1), Second(2) or Third(3) speed position, the D-range pressure PD is fed through the control valve 18 and the shuttle valve 41 to the forward clutch F/C thereby to cause the same to assume the engaged condition. Thus, under this condition, selection of the first, second or third speed gear position of the transmission becomes available. While at the Fourth speed position, the hydraulic pressure for the forward clutch F/C is drained through the drain port 18c and thus the forward clutch F/C becomes disengaged. Thus, the undesired friction of the forward one-way clutch FO/C is suppressed. If the above-mentioned stick occurs, the shift lever is moved to the 2'nd-speed moving the manual valve 14 to 2'nd-range. With this, the 2'nd-range pressure for the fluid line 20 is fed through the shuttle valve 41 to the forward clutch F/C to cause the same to take the engaged condition. Thus, selection of the first, second or third speed gear position of the transmission is available.

FIG. 5 shows a further modification of the present invention, which is applied to the construction of the forward clutch F/C to obtain the above-mentioned fail-safe action. This modification is usable in both the control circuits of FIGS. 3 and 6.

Figure 7:
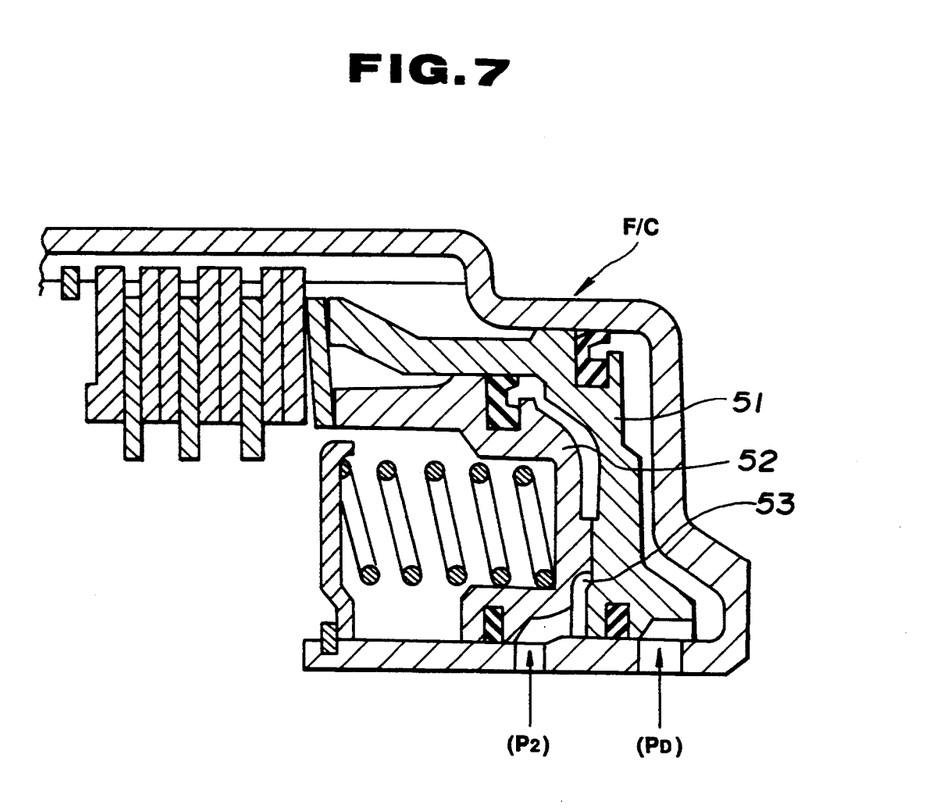
FIG. 7 is a partial sectional view of a forward clutch employed in a further modification of the present invention.

In the further modification of FIG. 7, the forward clutch F/C is responsive to the D-range pressure PD which is fed thereto through the forward clutch control valve 18. An auxiliary piston 52 is axially movably received in a main piston 51 having a pressure chamber 53 defined therebetween. The pressure chamber 53 is connected to the 2'nd-range pressure fluid line 20. If, due to the above-mentioned failure of the forward clutch control valve 18, the main piston 51 does not receive the Drive-range pressure PD, the main piston 51 can not be moved. In this case, the shift lever is moved to the Second(2)-position moving the manual valve 14 to 2'nd-range position. With this, the 2'nd-range pressure P2 then produced is fed to the pressure chamber 53 thereby to move the auxiliary piston 52 to a position to engage the outer and inner races. With this, the forward clutch F/C is engaged and thus selection of the first, second or third speed gear position of the transmission becomes available.

What is claimed is:

1. An automatics transmission comprising:
   a manual valve movable to a position to produce a hydraulic pressure which allows the transmission to automatically select a desired speed gear position;
   a one-way clutch having engaged and disengaged conditions;
   a first friction element which, when receiving the hydraulic pressure from said manual valve, is engaged to cause the transmission to take a lower speed gear position with an aid of the engaged condition of said one-way clutch;
   a second friction element which, when engaged under said lower speed gear position, cancels the engaged condition of said one-way clutch thereby to cause the transmission to take a higher speed gear position;
   a control valve which, under said higher speed gear position, drains a hydraulic pressure of said first friction element to suppress undesired friction of said one-way clutch; and
   means for causing said first friction element to become engaged when said manual valve is moved to another position to produce a given hydraulic pressure for causing the transmission to take an engine brake permitting condition.

2. An automatic transmission as claimed in claim 1, in which said means comprises:
   means defining a drain port of said control valve;
   a hydraulic circuit for producing the given hydraulic pressure for the engine brake condition of the transmission; and
   means for fluidly connecting said drain port to said hydraulic circuit.

3. An automatic transmission comprising:
   a manual valve movable to D-range position to produce a hydraulic pressure which allows the transmission to automatically select a desired speed gear position;
   a forward one-way clutch having engaged and disengaged conditions;
   a forward clutch which, when receiving the hydraulic pressure from said manual valve, is engaged to cause the transmission to take a lower speed gear position with an aid of the engaged condition of said forward one-way clutch;
   a band brake which, when engaged under said lower speed gear position, cancels the engaged condition of said forward one-way clutch thereby to cause the transmission to take a higher speed gear position;
   a forward clutch control valve which, under said higher speed gear position, drains a hydraulic pressure of said forward clutch to disengage the same; and
   means for causing said forward clutch to become engaged when said manual valve is moved to Second-range position to produce a 2'nd-range pressure for causing the transmission to take a gear position which permits engine brake.

4. An automatic transmission as claimed in claim 3, in which said means comprises:
   means defining a drain port of said forward clutch control valve;
   a hydraulic circuit for producing 2'nd-range pressure which causes the transmission to take 2'nd-speed gear position; and
   a fluid line connecting said drain port to said hydraulic circuit.

5. An automatic transmission comprising:
   a manual valve movable to a position to produce a hydraulic pressure which allows the transmission to automatically select a desired speed gear position;
   a one-way clutch having engaged and disengaged conditions;
   a first friction element which, when receiving the hydraulic pressure from said manual valve, is engaged to cause the transmission to take a lower speed gear position with an aid of the engaged condition of said one-way clutch;
   a second friction element which, when engaged under said lower speed gear position, cancels the engaged condition of said one-way clutch thereby to cause the transmission to take a higher speed gear position;
   a control valve which, under said higher speed gear position, drains a hydraulic pressure of said first friction element to suppress undesired friction of said one-way clutch; and
   means for causing said first friction element to become engaged when said manual valve is moved to another position to produce a given hydraulic pressure for causing the transmission to take an engine brake permitting condition,
   wherein said means comprises:
   a shuttle valve having two inlet ports and one outlet port;
   a first conduit extending from said control valve to one of said inlet ports of said shuttle valve;
   a second conduit extending from said outlet portion of said shuttle valve to said first friction element;
   a hydraulic circuit for producing the given hydraulic pressure of the engine brake condition of the transmission; and
   a third conduit extending from said hydraulic circuit to the other one of said inlet ports of said shuttle valve.

6. An automatic transmission comprising:
   a manual valve movable to a position to produce a hydraulic pressure which allows the transmission to automatically select a desired speed gear position;
   a one-way clutch having engaged and disengaged conditions;
   a first friction element which, when receiving the hydraulic pressure from said manual valve, is engaged to cause the transmission to take a lower speed gear position with an aid of the engaged condition of said one-way clutch;
   a second friction element which, when engaged under said lower speed gear position, cancels the engaged condition of said one-way clutch thereby to cause the transmission to take a higher speed gear position;

a control valve which, under said higher speed gear position, drains a hydraulic pressure of said first friction element to suppress undesired friction of said one-way clutch; and means for causing said first friction element to become engaged when said manual valve is moved to another position to produce a given hydraulic pressure for causing the transmission to take an engine brake permitting condition, wherein said first friction element is equipped with an auxiliary hydraulically operated piston in addition to a main hydraulically operated piston, said auxiliary hydraulically operated piston inducing the engaged condition of the first friction element when applied with the given hydraulic pressure.

7. An automatic transmission comprising:

a manual valve movable to D-range position to produce a hydraulic pressure which allows the transmission to automatically select a desired speed gear position;

a forward one-way clutch having engaged and disengaged conditions;

a forward clutch which, when receiving the hydraulic pressure from said manual valve, is engaged to cause the transmission to take a lower speed gear position with an aid of the engaged condition of said forward one-way clutch;

a band brake which, when engaged under said lower speed gear position, cancels the engaged condition of said forward one-way clutch thereby to cause the transmission to take a higher speed gear position;

a forward clutch control valve which, under said higher speed gear position, drains a hydraulic pressure of said forward clutch to disengage the same; and means for causing said forward clutch to become engaged when said manual valve is moved to Second-range position to produce a 2'nd-range pressure for causing the transmission to take a gear position which permits engine brake, wherein said means comprises:

a shuttle valve having two inlet ports and one outlet port;

a first fluid line extending from said forward clutch control valve to one of said inlet ports of said shuttle valve;

a second fluid line extending from said outlet portion of said shuttle valve to said forward clutch;

a hydraulic circuit for producing 2'nd-range pressure which causes the transmission to take 2'nd-speed gear position; and a third fluid line extending from said hydraulic circuit to the other one of said inlet ports of said shuttle valve.

8. An automatic transmission comprising:

a manual valve movable to D-range position to produce a hydraulic pressure which allows the transmission to automatically select a desired speed gear position;

a forward one-way clutch having engaged and disengaged conditions;

a forward clutch which, when receiving the hydraulic pressure from said manual valve, is engaged to cause the transmission to take a lower speed gear position with an aid of the engaged condition of said forward one-way clutch;

a band brake which, when engaged under said lower speed gear position, cancels the engaged condition of said forward one-way clutch thereby to cause the transmission to take a higher speed gear position;

a forward clutch control valve which, under said higher speed gear position, drains a hydraulic pressure of said forward clutch to disengage the same; and means for causing said forward clutch to become engaged when said manual valve is moved to Second-range position to produce a 2'nd-range pressure for causing the transmission to take a gear position which permits engine brake, and wherein said forward clutch comprises:

a main piston unit which induces an engaged condition of said forward clutch when applied with a hydraulic pressure;

an auxiliary piston unit which is operatively mounted in said main piston unit, said auxiliary piston unit inducing also said engaged condition of said forward clutch when a piston chamber thereof is fed with a hydraulic pressure; and means for feeding said piston chamber with the 2'nd-range pressure.

* * * * *